United States Patent [19]
Krause

[11] 4,245,227
[45] Jan. 13, 1981

[54] INK JET HEAD HAVING AN OUTER WALL OF INK CAVITY OF PIEZOELECTRIC MATERIAL

[75] Inventor: Konrad A. Krause, Mt. View, Calif.

[73] Assignee: International Business Machines Corporation, Armonk, N.Y.

[21] Appl. No.: 93,490

[22] Filed: Nov. 13, 1979

Related U.S. Application Data

[63] Continuation of Ser. No. 958,855, Nov. 8, 1978, abandoned.

[51] Int. Cl.² ............................................. G01D 15/18
[52] U.S. Cl. ................. 346/75; 346/140 R; 239/4
[58] Field of Search ............ 346/75, 140 R; 310/328; 239/4, 101, 102, 696

[56] References Cited

U.S. PATENT DOCUMENTS

| | | | |
|---|---|---|---|
| 2,317,166 | 4/1943 | Abrams . | |
| 3,150,592 | 9/1964 | Stec . | |
| 3,215,078 | 11/1965 | Stec | 310/328 X |
| 3,334,350 | 8/1967 | Adams | 346/75 |
| 3,452,360 | 6/1969 | Williamson | 346/140 R |
| 3,683,212 | 8/1972 | Zoltan | 346/75 X |
| 3,709,432 | 1/1973 | Robertson | 346/75 X |
| 3,832,579 | 8/1974 | Arndt | 346/140 R X |
| 3,848,118 | 11/1974 | Rittberg | 239/101 |
| 3,924,974 | 12/1975 | Fischbeck et al. | 346/75 X |
| 3,958,249 | 5/1976 | DeMaine et al. | 346/75 X |
| 4,065,774 | 12/1977 | Lee | 346/140 R |
| 4,074,277 | 2/1978 | Lane et al. | 346/75 |
| 4,138,687 | 2/1979 | Cha et al. | 346/75 |

*Primary Examiner*—George H. Miller, Jr.
*Attorney, Agent, or Firm*—Frank C. Leach, Jr.

[57] ABSTRACT

An ink jet head has coaxially disposed inner and outer cylindrical tubes with the outer cylindrical surface of the inner cylindrical tube spaced from the inner cylindrical surface of the outer cylindrical tube to form an ink cavity therebetween from which ink is supplied through one or more arrays of ink jet nozzles. Only the outer tube is a piezoelectric material so that the outer tube vibrates radially when electrically excited to produce vibrations in the ink in the ink cavity whereby a stream of ink droplets is supplied from each of the ink jet nozzles. In embodiments having only multiple arrays of ink jet nozzles, if desired, only the inner cylindrical tube or both the inner and outer cylindrical tubes can be formed of a piezoelectric material. If both of the tubes are formed of a piezoelectric material, the operating frequencies, which are preferably resonant, of the two tubes must then be matched.

18 Claims, 18 Drawing Figures

INK JET HEAD HAVING AN OUTER WALL OF INK CAVITY OF PIEZOELECTRIC MATERIAL

This is a continuation, of application Ser. No. 958,855 filed Nov. 8, 1978 now abandoned.

Cross reference is made to the copending patent application of Gary L. Fillmore et al for "Ink Jet Head," Ser. No. 958,916, filed Nov. 8, 1978, and assigned to the same assignee as the assignee of this application.

When a plurality of ink jet nozzles is connected to an ink cavity, it is desired that the ink droplets produced from the streams passing through each of the nozzles have substantially the same break-off point, be substantially uniform in size, have substantially uniform spacing between the droplets, and be satellite free. This insures that the quality of the print from each of the nozzles will be substantially the same.

To obtain this uniformity between the droplets of the various streams, it is necessary that the perturbations applied to each of the ink streams of the nozzles be substantially uniform and that the nozzles be of uniform quality. Furthermore, for the production of the droplets to be satellite free, the parturbations must be sufficiently large. It also is a requisite for the perturbations to not only be substantially uniform but to be reproducible throughout the time that the droplets are being produced.

It also is necessary that the transducer or driver, which produces the vibrations to create the perturbations in the ink streams, be capable of producing the droplets at the desired frequency. This is determined by the overall requirements of the ink jet system including the size of the droplets, the spacing between the droplets on the medium on which the droplets are impinged, the rate at which the droplets can be charged, and the rate of relative movement between the medium and the nozzles. Thus, the transducer or driver must be capable of operating at a specific frequency.

The present invention accomplishes this through providing a pair of elements with one of the elements preferably surrounding the other and the elements having their longitudinal axes preferably coaxial and at least parallel. With multiple arrays of ink jet nozzles, at least one of the inner and outer elements, which are preferably right circular cylindrical tubes, is formed of a piezoelectric material and is polarized to vibrate substantially perpendicular to its longitudinal axis when electrically excited so that nozzles, which have their axes disposed substantially perpendicular to the longitudinal axis of the inner element, will have the streams of ink droplets supplied therefrom uniformly. With only a single array or a single nozzle, only the outer element is formed of a piezoelectric material.

With the ink jet head of the present invention capable of having a plurality of arrays of ink jet nozzles supplying streams of ink droplets therefrom at the same time, a plurality of separate recording mediums can have ink droplets supplied thereto from a single ink jet head. Thus, a relatively low cost print head for a plurality of separate recording mediums is provided.

An object of this invention is to provide an ink jet head having a plurality of arrays of ink jet nozzles.

Another object of this invention is to provide a unique ink jet head.

A further object of this invention is to provide a method for forming an ink jet head having a plurality of arrays of ink jet nozzles.

Still another object of this invention is to provide a method for forming a unique ink jet head.

The foregoing and other objects, features, and advantages of the invention will be apparent from the following more particular description of preferred embodiments of the invention as illustrated in the accompanying drawings.

Figure 1:
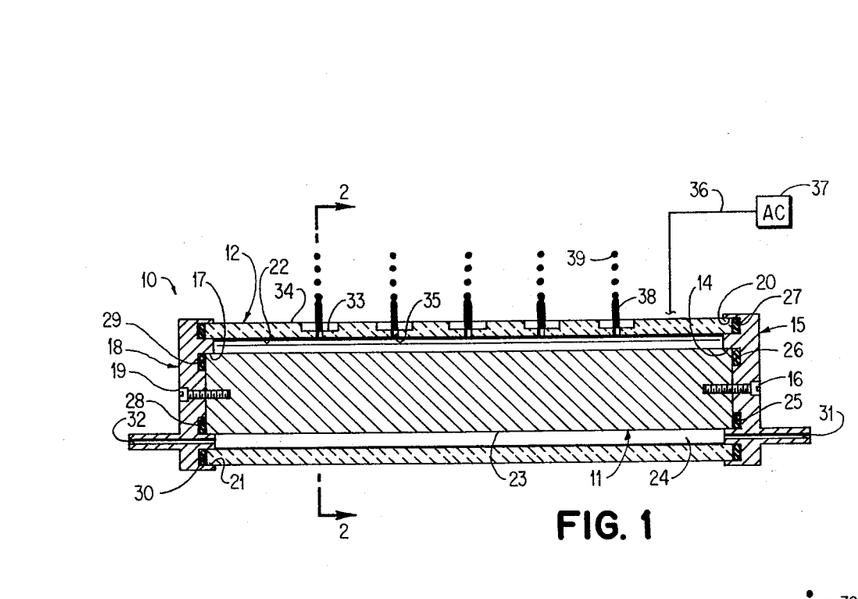
FIG. 1 is a longitudinal sectional view of one form of an ink jet head of the present invention in which an outer cylindrical tube, which forms the outer wall of the ink cavity, is formed of a piezoelectric material with the ink cavity having no ink therein for clarity purposes and taken along line 1—1 of FIG. 2.
Figure 2:
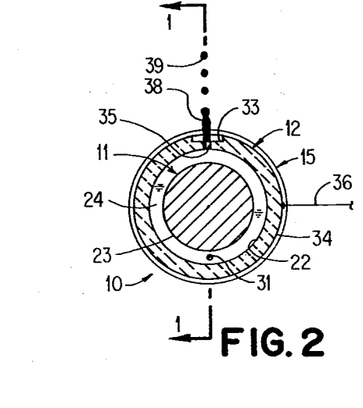
FIG. 2 is a sectional view of the ink jet head of FIG. 1 with the ink cavity having no ink therein for clarity purposes and taken along line 2—2 of FIG. 1.
Figure 3:
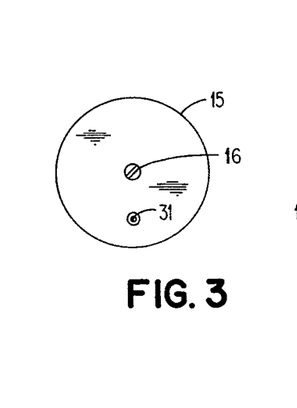
FIG. 3 is an end elevational view of the ink jet head of FIG. 1.

Referring to the drawings and particularly FIGS. 1-3, there is shown an ink jet head 10 of the present invention. The ink jet head 10 includes an inner cylindrical element 11, which is formed of metal, for example, and an outer cylindrical tube 12, which is formed of a piezoelectric material, disposed in surrounding relation to the inner cylindrical element 11 and spaced therefrom.

One end of the element 11 is disposed within a circular recess 14 in an entry end plate 15, which is circular. A mounting screw 16 secures the entry end plate 15 to the adjacent end of the inner cylindrical element 11.

The other end of the element 11 is disposed within a circular recess 17 in an exit end plate 18, which is circular. A mounting screw 19 secures the exit end plate 18 to the adjacent end of the inner cylindrical element 11.

The outer cylindrical tube 12 has one end disposed within an annular groove 20 in the entry end plate 15 and its other end disposed within an annular groove 21 in the exit end plate 18. Thus, the outer cylindrical tube 12 is retained between the end plates 15 and 18 when they are secured to the inner cylindrical element 11.

Accordingly, the outer cylindrical tube 12 has its inner cylindrical surface 22 spaced the same distance from outer cylindrical surface 23 of the inner cylindrical element 11 throughout the length and around the entire circumference. Thus, an annular ink cavity 24 is formed between the inner cylindrical surface 22 of the outer cylindrical tube 12 and the outer cylindrical surface 23 of the inner cylindrical element 11.

The circular recess 14 in the entry end plate 15 has an annular groove 25 adjacent its circumference to receive an O-ring 26 to form a seal between one end of the inner cylindrical element 11 and the entry end plate 15. The entry end plate 15 has a second O-ring 27, which is disposed within the annular groove 20, engaging the end of the outer cylindrical tube 12 in the annular groove 20 to form a seal therebetween. Accordingly, the O-rings 26 and 27 cooperate to seal the ink cavity 24 relative to the entry end plate 15.

The circular recess 17 in the exit end plate 18 has an annular groove 28 adjacent its circumference to receive an O-ring 29 to form a seal between the end of the inner cylindrical element 11 and the exit end plate 18. The exit end plate 18 has a second O-ring 30, which is disposed within the annular groove 21, bearing against the end of the outer cylindrical tube 12 disposed therein to form a seal therebetween. Accordingly, the O-rings 29 and 30 cooperate to seal the ink cavity 24 relative to the exit end plate 18.

The ink cavity 24 has pressurized, conductive ink supplied thereto from a pressurized source such as a pump, for example, through a passage 31 in the entry end plate 15. Whenever it is desired to flush the ink cavity 24, the pressurized ink flows from the ink cavity 24 through a passage 32 in the exit end plate 18 to an ink reservoir or the like connected to the suction side of the pump. This flow path from the ink cavity 24 is normally blocked.

The ink is grounded in any suitable manner. If the entry end plate 15 is formed of metal, it could be grounded to ground the ink in the cavity 24. If the entry end plate 15 is formed of a plastic such as an acetal plastic sold under the trademark Delrin, for example, then the ink must be grounded in some other suitable manner.

The outer cylindrical tube 12 has a plurality of longitudinally spaced flat portions 33 in its outer surface 34. Each of the flat portions 33 has an orifice 35, which functions as a nozzle, formed therein and extending through the outer cylindrical tube 12 to provide communication from the ink cavity 24 to the exterior of the outer cylindrical tube 12. Thus, the row of the orifices 35 forms an array of nozzles.

The axis of each of the orifices 35 is disposed substantially perpendicular to the longitudinal axis of the inner cylindrical element 11 and the longitudinal axis of the outer cylindrical tube 12. The longitudinal axis of the outer cylindrical tube 12 is preferably coaxial with the longitudinal axis of the inner cylindrical element 11 although they could be parallel.

As previously mentioned, the outer cylindrical tube 12 is formed of a piezoelectric material. It is polarized so that it vibrates in a radial direction when a voltage is applied thereto. The operating frequency at which the outer cylindrical tube 12 is electrically excited is preferably at or below its resonant frequency but it could be electrically excited above its resonant frequency in certain instances.

The outer cylindrical tube 12 has its outer surface 34 metallized so that the outer cylindrical tube 12 can be electrically connected through a lead 36 to an AC source 37 of power. Accordingly, when the AC source 37 of power is energized at a frequency, which is preferably equal to or below the resonant frequency of the outer cylindrical tube 12, the outer cylindrical tube 12 vibrates radially. This causes each ink stream 38 passing through one of the orifices 35 to be broken up into droplets 39 at a uniform break-off point with the droplets 39 being of substantially uniform size and having substantially uniform spacing therebetween.

Figure 4:
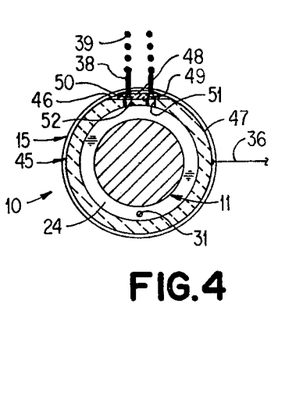
FIG. 4 is a sectional view, taken along line 2—2 of FIG. 1, of the ink jet head of FIG. 1 with the ink cavity having no ink therein for clarity purposes and showing two offset arrays of nozzles in a nozzle plate on the outer cylindrical tube.

Referring to FIG. 4, there is shown another form of the ink jet head 10 in which the outer cylindrical tube 12 is replaced by an outer cylindrical tube 45, which is formed of a piezoelectric material. The remainder of the structure of the ink jet head 10 of FIG. 4 is the same as shown in FIGS. 1-3.

The outer cylindrical tube 45 is similar to the outer cylindrical tube 12 except that it has a single continuous flat portion 46 formed in its outer surface 47 so as to have a nozzle plate 48, which is preferably silicon, mounted thereon. It should be understood that the flat portion 46 extends for substantially the same length as the distance between the extreme edges of the outermost of the flat portions 33 in the outer surface 34 of the outer cylindrical tube 12 as shown in FIG. 1.

The nozzle plate 48 has two offset arrays of ink jet nozzles 49 and 50. Each of the longitudinally spaced nozzles 49 is aligned with an orifice 51 extending through the outer cylindrical tube 45 to the ink cavity 24 to provide communication therewith. Each of the longitudinally spaced nozzles 50 is aligned with an orifice 52, which extends through the outer cylindrical tube 45 to communication with the ink cavity 24.

Accordingly, when the outer cylindrical tube 45 is vibrated in the same manner as the outer cylindrical tube 12, the droplets 39 are produced in the same manner as discussed with respect to FIG. 1. Thus, a first plurality of the streams 38 passes through the nozzles 49 in the nozzle plate 48 with each of the streams 38 being broken up into the droplets 39. Similarly, a second plurality of the streams 38 passes through the nozzles 50 with each of the streams being broken up into the droplets 39. Accordingly, two offset rows of the droplets 39 are produced.

Figure 5:
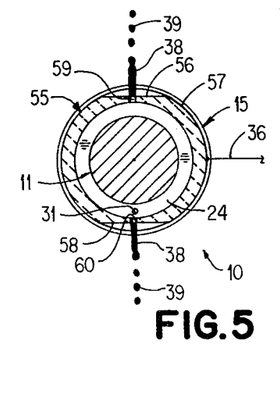
FIG. 5 is a sectional view, taken along line 2—2 of FIG. 1, of the ink jet head of FIG. 1 with the ink cavity having no ink therein for clarity purposes and showing the ink jet head having two arrays of nozzles in the outer cylindrical tube and spaced 180° from each other.

Referring to FIG. 5, there is shown an outer cylindrical tube 55, which is formed of a piezoelectric material, used in place of the outer cylindrical tube 12. The remainder of the structure of the ink jet head 10 of FIG. 5 is the same as shown in FIGS. 1-3.

The outer cylindrical tube 55 has a plurality of longitudinally spaced flat portions 56 formed in its outer surface 57 in the same manner as the flat portions 33 are formed in the outer surface 34 of the outer cylindrical tube 12. The outer cylindrical tube 55 has longitudinally spaced flat portions 58, which are diametrically disposed to the flat portions 56, formed in the same manner as the flat portions 33 are formed in the outer surface 34 of the outer cylindrical tube 12.

Each of the flat portions 56 has an orifice 59 formed therein and extending through the outer cylindrical tube 55 to provide communication from the ink cavity 24 to the exterior of the outer cylindrical tube 55. Similarly, each of the flat portions 58 has an orifice 60 formed therein and extending through the outer cylindrical tube 55 to communicate with the ink cavity 24.

Accordingly, when the outer cylindrical tube 55 is vibrated in the same manner as the outer cylindrical tube 12, the ink stream 38 flows from each of the orifices 59 and each of the orifices 60 and breaks up into the droplets 39. Thus, the droplets 39 from each of the orifices 59 can be utilized with a first recording medium and the droplets 39 from each of the orifices 60 can be employed with a second recording medium so that the ink jet head 10 functions as a double print head.

Figure 6:
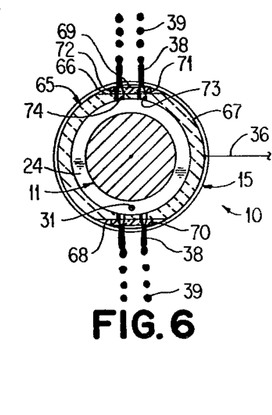
FIG. 6 is a sectional view, taken along line 2—2 of FIG. 1, of the ink jet head of FIG. 1 with the ink cavity having no ink therein for clarity purposes and showing two sets of arrays of nozzles in a nozzle plate on each side of the outer cylindrical tube.

Referring to FIG. 6, there is shown an outer cylindrical tube 65, which is formed of a piezoelectric material, being used in the ink jet head 10 in place of the outer cylindrical tube 12. The remainder of the structure is the same as that shown in FIG. 1.

The outer cylindrical tube 65 has a first flat portion 66 formed in its outer surface 67 and a second flat portion 68, which is diametrically disposed to the first flat portion 66, formed in its outer surface 67. Each of the flat portions 66 and 68 extends for the same distance, which is preferably the same as that from the extreme edges of the outermost flat portions 33 in the outer surface 34 of the outer cylindrical tube 12 as shown in FIG. 1.

The flat portions 66 and 68 have nozzle plates 69 and 70, respectively, mounted thereon. The nozzle plate 69, which is preferably silicon, has a first array of longitudinally spaced nozzles 71 and a second array of longitudinally spaced nozzles 72 offset from the array of nozzles 71. The nozzles 71 communicate with the ink cavity 24 through orifices 73, which extend through the outer cylindrical tube 65 to the ink cavity 24. The nozzles 72 communicate with the ink cavity 24 through orifices 74, which extend through the outer cylindrical tube 65 to the ink cavity 24. The nozzle plate 70 is similarly formed as the nozzle plate 69.

Accordingly, when the outer cylindrical tube 65 vibrates in the manner previously described for the outer cylindrical tube 12, the droplets 39 are produced in two rows from each of the opposite sides of the outer cylindrical tube 65. Thus, two separate recording mediums may be utilized with each receiving two rows of the droplets 39.

It should be understood that the outer cylindrical tube 12 of FIGS. 1-3 could be formed in a manner similar to the outer cylindrical tube 45 of FIG. 4 so as to have a single row of the nozzles formed in a nozzle plate. Similarly, the outer cylindrical tube 55 of FIG. 5 could have each of the flat portions 56 and 58 continuous with a nozzle plate mounted thereon in the same manner as shown in FIG. 6.

It also should be understood that the outer cylindrical tube 45 of FIG. 4 could have a plurality of longitudinally spaced flat portions rather than the single flat portion 46 in the same manner as the flat portions 33 of FIG. 1 are formed in the outer cylindrical tube 12 and be utilized without the nozzle plate 48. Likewise, the nozzle plates 69 and 70 of FIG. 6 could be omitted from the outer cylindrical tube 65 and each of the flat portions 66 and 68 be a plurality of separate, longitudinally spaced flat portions like the flat portions 33 of FIG. 1 rather than a single continuous flat portion.

Figure 7:
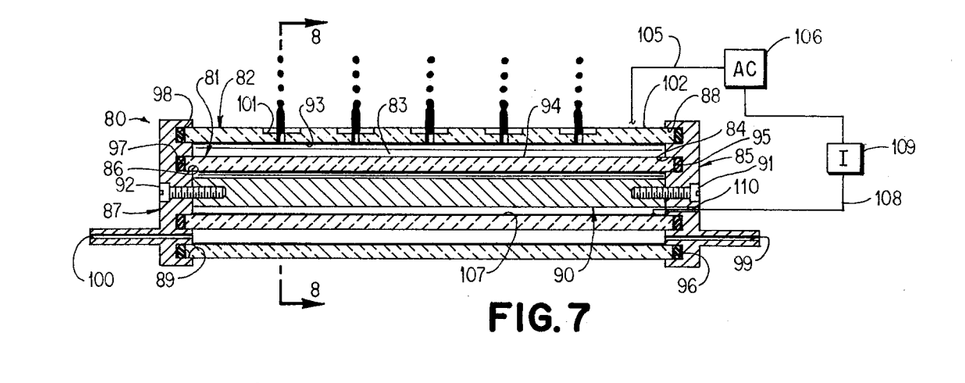
FIG. 7 is a longitudinal sectional view of another form of the ink jet head of the present invention in which each of inner and outer cylindrical tubes, which form the walls of the ink cavity, is formed of a piezoelectric material with the ink cavity having no ink therein for clarity purposes and taken along line 7—7 of FIG. 8.
Figure 8:
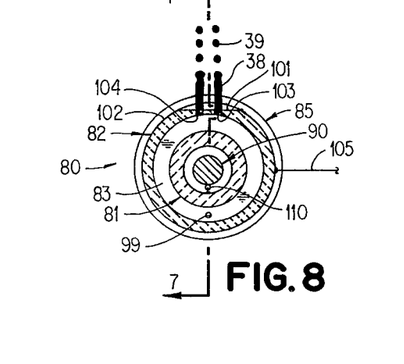
FIG. 8 is a sectional view of the ink jet head of FIG. 7 with the ink cavity having no ink therein for clarity purposes and taken along line 8—8 of FIG. 7.
Figure 9:
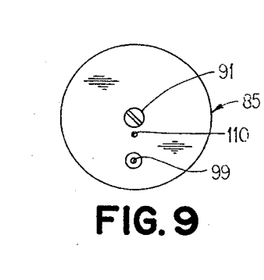
FIG. 9 is an end elevational view of the ink jet head of FIG. 7.

Referring to FIGS. 7-9, there is shown as ink jet head 80, which includes an inner cylindrical tube 81 and an outer cylindrical tube 82. Each of the inner cylindrical tube 81 and the outer cylindrical tube 82 is formed of a piezoelectric material. The outer cylindrical tube 82 is disposed in surrounding relation to the inner cylindrical tube 81 and spaced therefrom to form an ink cavity 83 therebetween.

The inner cylindrical tube 81 has one end disposed within an annular groove 84 in an entry end plate 85 and its other end disposed in an annular groove 86 in an exit end plate 87. The outer cylindrical tube 82 has one end disposed in an annular groove 88 in the entry end plate 85 and its other end disposed in an annular groove 89 in the exit end plate 87.

A cylindrical connecting element 90 extends between the inner surfaces of the entry end plate 85 and the exit end plate 87 and abuts against each. A mounting screw 91 secures the entry end plate 85 to one end of the connecting element 90, and a mounting screw 92 attaches the exit end plate 87 to the other end of the connecting element 90.

Accordingly, the outer cylindrical tube 82 has its inner cylindrical surface 93 spaced the same distance from outer cylindrical surface 94 of the inner cylindrical tube 81 throughout the length and around the entire circumference. Thus, the annular ink cavity 83 has the same spacing between its walls at any point.

The entry end plate 85 has a first O-ring 95, which is disposed within the annular groove 84, engaging the end of the inner cylindrical tube 81 in the annular groove 84 to form a seal therebetween. The entry end plate 85 has a second O-ring 96, which is disposed within the annular groove 88, abutting the end of the outer cylindrical tube 82 in the annular groove 88 to form a seal therebetween. Accordingly, the O-rings 95 and 96 cooperate to seal the ink cavity 83 relative to the entry end plate 85.

The exit end plate 87 has a first O-ring 97, which is disposed within the annular groove 86, engaging the end of the inner cylindrical tube 81 in the annular groove 86 to form a seal therebetween. The exit end plate 87 has a second O-ring 98, which is disposed within the annular groove 89, abutting the end of the outer cylindrical tube 82 in the annular groove 89 to form a seal therebetween. Accordingly, the O-rings 97 and 98 cooperte to seal the ink cavity 83 relative to the exit end plate 87.

The ink cavity 83 has pressurized, conductive ink supplied thereto through a passage 99 in the entry end plate 85 in the same manner as described for the ink jet head 10 of FIG. 1. Flushing can occur in the same manner as described for the ink jet head 10 through utilization of a passage 100 in the exit end plate 87. The ink is grounded in any suitable manner.

The outer cylindrical tube 82 has a plurality of longitudinally spaced flat portions 101 in its outer surface 102. Each of the flat portions 101 has a first orifice 103 and a second orifice 104 formed therein. Each of the orifices 103 and 104 extends through the outer cylindrical tube 82 to provide communication from the ink cavity 83 to the exterior of the outer cylindrical tube 82 and functions as a nozzle. Thus, there are two offset arrays of nozzles formed in the outer cylindrical tube 82 with the row of the orifices 103 forming one of the arrays of nozzles and the row of the orifices 104 forming the other of the arrays of nozzles.

The axis of each of the orifices 103 and of each of the orifices 104 is disposed substantially perpendicular to the longitudinal axis of the inner cylindrical tube 81 and the longitudinal axis of the outer cylindrical tube 82. The longitudinal axis of the outer cylindrical tube 82 is preferably coaxial with the longitudinal axis of the inner cylindrical tube 81 although they could be parallel.

As previously mentioned, each of the inner cylindrical tube 81 and the outer cylindrical tube 82 is formed of a piezoelectric material. In order for the resonant operating frequencies of the inner cylindrical tube 81 and the outer cylindrical tube 82 to be matched, it is necessary that they be formed of different piezoelectric materials.

Each of the inner cylindrical tube 81 and the outer cylindrical tube 82 is polarized to vibrate in a radial direction when a voltage is applied thereto. The operating frequency at which the inner cylindrical tube 81 and the outer cylindrical tube 82 is electrically excited is preferably the matched resonant frequency but any matched operating frequency below the matched resonant frequency also could be employed. It should be understood that one of the tubes 81 and 82 could be electrically excited at its resonant frequency and the other of the tubes 81 and 82 having its operating frequency matched therewith.

The outer cylindrical tube 82 has its outer surface 102 metallized so that the outer cylindrical tube 82 can be electrically connected through a lead 105 to an AC source 106 of power. The inner cylindrical tube 81 has its inner cylindrical surface 107 metallized so that the inner cylindrical tube 81 can be electrically connected through a lead 108 and a phase inverter 109 to the AC source 106 of power. The lead 108 passes through a passage 110 in the entry end plate 85.

Accordingly, when the AC source 106 of power is energized at a frequency, which is preferably equal to or below the matched resonant frequency of the inner cylindrical tube 81 and the outer cylindrical tube 82, each of the inner cylindrical tube 81 and the outer cylindrical tube 82 vibrates radially with one expanding while the other is contracting. This causes the ink streams 38 passing through each of the orifices 103 and each of the orifices 104 to be broken up into the droplets 39.

Figure 10:
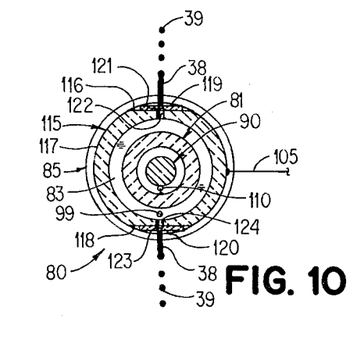
FIG. 10 is a sectional view, taken along line 8—8 of FIG. 7, of the ink jet head of FIG. 7 with the ink cavity having no ink therein for clarity purposes and showing the ink jet head having two arrays of ink jet nozzles spaced 180° from each other with each array being in a nozzle plate on the outer cylindrical tube.

Referring to FIG. 10, there is shown another form of the ink jet head 80 in which the outer cylindrical tube 82 is replaced by an outer cylindrical tube 115, which is formed of a piezoelectric material. The remainder of the structure of the ink jet head 80 of FIG. 10 is the same as shown in FIGS. 7–9.

The outer cylindrical tube 115 has a first flat portion 116 formed in its outer cylindrical surface 117 and extending for substantially the same length as the distance between the extreme edges of the outermost flat portions 101 of FIG. 7. The outer cylindrical tube 115 has a second flat portion 118, which is diametrically disposed to the first flat portion 116, formed in its outer cylindrical surface 117. The second flat portion 118 extends for the same length as the first flat portion 116.

A nozzle plate 119, which is preferably silicon, is mounted on the first flat portion 116, and a nozzle plate 120, which is preferably silicon, is mounted on the second flat portion 118. The nozzle plate 119 has a plurality of longitudinally spaced nozzles 121 therein with each of the nozzles 121 communicating with the ink cavity 83 through an orifice 122 in the outer cylindrical tube 115. Each of the orifices 122 extends through the outer cylindrical tube 115 to the ink cavity 83.

The nozzle plate 120 has a plurality of longitudinally spaced nozzles 123 therein with each of the nozzles 123 communicating with the ink cavity 83 through an orifice 124 in the outer cylindrical tube 115. Each of the orifices 124 extends through the outer cylindrical tube 115 to the ink cavity 83.

Accordingly, each of the nozzles 121 has one of the streams 38 pass therethrough, and each of the nozzles 123 has one of the streams 38 pass therethrough. Therefore, when the inner cylindrical tube 81 and the outer cylindrical tube 115 vibrate radially in the same manner as described for the inner cylindrical tube 81 and the outer cylindrical tube 82 of FIG. 7, the streams 38 are broken up into the droplets 39 and applied to two separate recording mediums.

Figure 11:
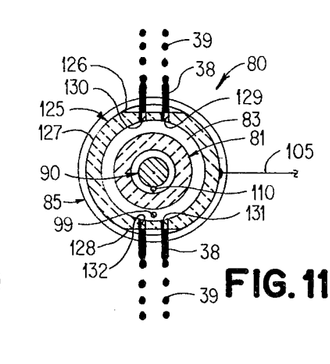
FIG. 11 is a sectional view, taken along line 8—8 of FIG. 7, of the ink jet head of FIG. 7 with the ink cavity having no ink therein for clarity purposes and showing the ink jet head having two offset arrays of ink jet nozzles on each side of the outer cylindrical tube.

Referring to FIG. 11, there is shown another form of the ink jet head 80 in which the outer cylindrical tube 82 is replaced by an outer cylindrical tube 125, which is formed of a piezoelectric material. The remainder of the structure of the ink jet head 80 of FIG. 11 is the same as shown in FIGS. 7–9.

The outer cylindrical tube 125 has a plurality of first flat portions 126 formed in its outer surface 127 in the same manner as the flat portions 101 on the outer cylindrical tube 82 of FIG. 7. A plurality of second flat portions 128 is formed in the outer cylindrical surface 127 of the outer cylindrical tube 125 and diametrically opposite to the first flat portions 126. Each of the second flat portions 128 is formed at the same longitudinal position as one of the diametrically disposed first flat portions 126.

Each of the first flat portions 126 has a first orifice 129 and a second orifice 130 formed therein with each of the orifices 129 and 130 providing communication from the ink cavity 83 to the exterior of the outer cylindrical tube 125. Thus, the orifices 129 form a first array of nozzles, and the orifices 130 form a second array of nozzles.

Each of the second flat portions 128 has a first orifice 131 and a second orifice 132 formed therein with each of the orifices 131 and 132 extending through the outer cylindrical tube 125 to provide communication from the ink cavity 83 to the exterior of the outer cylindrical tube 125. The orifices 131 forms a first array of nozzles on the opposite side of the outer cylindrical tube 125 from the orifices 129 and 130. The orifices 132 form a second array of nozzles, which is offset from the first array of nozzles formed by the orifices 131. Accordingly, this arrangement can be utilized with two separate recording mediums with two rows of the ink droplets 39 being applied to each of the recording mediums.

It should be understood that the outer cylindrical tube 82 of FIGS. 7-9 could be formed with the flat portions 101 as a continuous flat portion in a manner similar to the formation of the first flat portion 116 on the outer cylindrical tube 115 of FIG. 10 so as to have a nozzle plate with a single row of nozzles mounted thereon. Similarly, the outer cylindrical tube 125 of FIG. 11 could have each of the longitudinally spaced flat portions 126 and 128 continuous so as to have a nozzle plate mounted on each in the same manner as shown in FIG. 10. It also should be understood that the outer cylindrical tube 115 of FIG. 10 could have a plurality of longitudinally spaced flat portions rather than the single flat portion 116 and a plurality of longitudinally spaced flat portions rather than the single flat portion 118 in the same manner as the flat portions 101 are formed in the outer cylindrical tube 82 of FIGS. 7-9 and be utilized without the nozzle plates 119 and 120.

Figure 12:
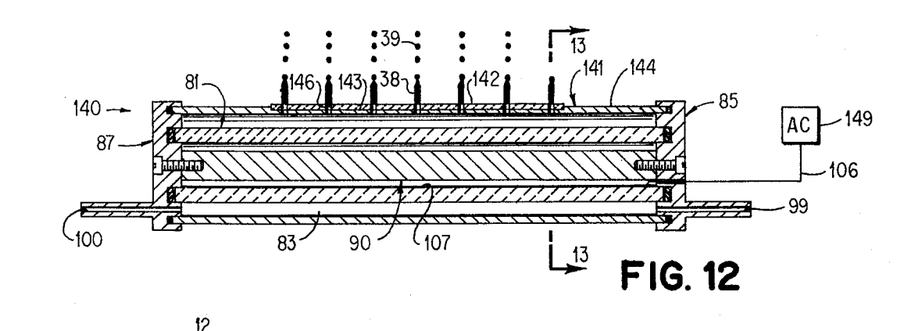
FIG. 12 is a longitudinal sectional view of another embodiment of the ink jet head of the present invention in which an inner cylindrical tube, which forms the inner wall of the ink cavity, is formed of a piezoelectric material with the ink cavity having no ink therein for clarity purposes and taken along line 12—12 of FIG. 13.
Figure 13:
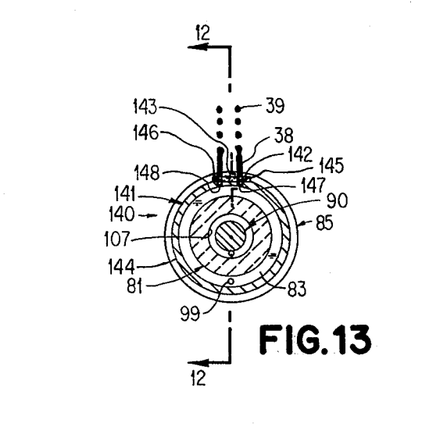
FIG. 13 is a sectional view of the ink jet head of FIG. 12 with the ink cavity having no ink therein for clarity purposes and taken along line 13—13 of FIG. 12.

Referring to FIGS. 12 and 13, there is shown an ink jet head 140, which has a similar construction to that of the ink jet head 80 except that the outer cylindrical tube 82 of piezoelectric material is replaced by an outer cylindrical tube 141, which is not formed of piezoelectric material but of metal, for example. The outer cylindrical tube 141 has a nozzle plate 142, which is preferably silicon, mounted thereon through forming a flat portion 143 in outer cylindrical surface 144 of the outer cylindrical tube 141.

The nozzle plate 142 has a first row of longitudinally spaced nozzles 145 forming a first array of nozzles and a second row of longitudinally spaced nozzles 146 forming a second array of nozzles. Thus, the two arrays of the nozzles in the nozzle plate 142 are offset from each other.

Each of the nozzles 145 in the nozzle plate 142 communicates through an orifice 147, which extends through the outer cylindrical tube 141, with the ink cavity 83. Each of the nozzles 146 communicates through an orifice 148, which extends through the outer cylindrical tube 141, with the ink cavity 83.

In the same manner as in FIG. 7, the inner cylindrical tube 81 has its inner surface 107 metallized and connected by the lead 106 to an AC source 149 of power. Accordingly, when the AC source 149 of power is energized at a frequency, which is preferably equal to or below the resonant frequency of the inner cylindrical tube 81, the inner cylindrical tube 81 vibrates radially. This causes each of the ink streams 38 passing through the nozzles 145 and 146 to be broken up into the droplets 39 to provide two rows of the droplets 39 for application to a recording medium.

Figure 14:
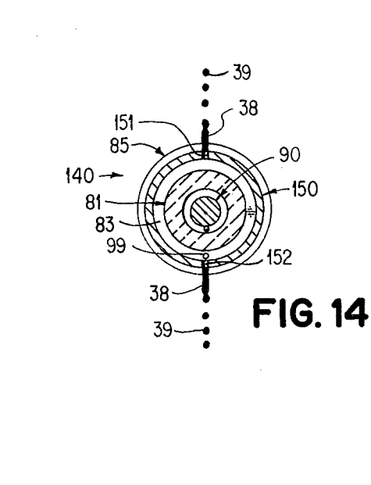
FIG. 14 is a sectional view, taken along line 13—13 of FIG. 12 of the ink jet head of FIG. 12 with the ink cavity having no ink therein for clarity purposes and showing the ink jet head having two arrays of ink jet nozzles in the outer cylindrical tube and spaced 180° from each other.

Referring to FIG. 14, there is shown another arrangement of the ink jet head 140 in which the outer cylindrical tube 141 is replaced by an outer cylindrical tube 150, which is formed of metal. The remainder of the structure of the ink jet head 140 of FIG. 14 is the same as shown in FIGS. 12 and 13.

The outer cylindrical tube 150 has a first row of longitudinally spaced orifices 151, which function as nozzles, extending therethrough to provide communication from the ink cavity 83 to the exterior of the outer cylindrical tube 150. The outer cylindrical tube 150 has a second row of longitudinally spaced orifices 152, which are diametrically disposed to the orifices 151 and function as nozzles, extending through the outer cylindrical tube 150 to provide communication from the ink cavity 83 to the exterior of the outer cylindrical tube 150.

When the inner cylindrical tube 81 is electrically excited from the AC source 149 of power, the streams 38 passing through the orifices 151 break up into the droplets 39 and the streams 38 exiting through the orifices 152 break up into the droplets 39. Thus, the ink jet head 140 of FIG. 14 can be utilized with two separate recording mediums with one of the recording mediums receiving the droplets 39 from the orifices 151 and the other of the recording mediums receiving the droplets 39 from the orifices 152.

Figure 15:
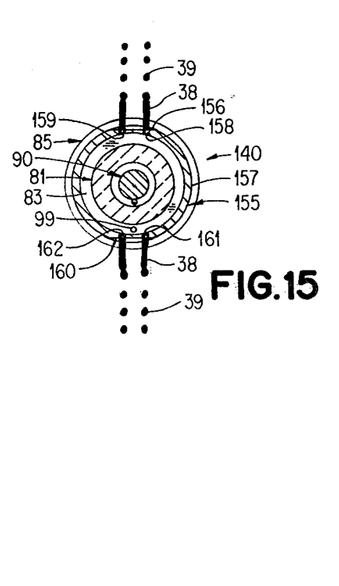
FIG. 15 is a sectional view, taken along line 13—13 of FIG. 12, of the ink jet head of FIG. 12 with the ink cavity having no ink therein for clarity purposes and showing the ink jet head having two offset arrays of ink jet nozzles on each side of the outer cylindrical tube.

Referring to FIG. 15, there is shown another arrangement of the ink jet head 140 in which an outer cylindrical tube 155 of metal is utilized in place of the outer cylindrical tube 141. The remainder of the structure of the ink jet head 140 of FIG. 15 is the same as shown in FIGS. 12 and 13.

The outer cylindrical tube 155 has a plurality of first flat portions 156, which are longitudinally spaced, formed in its outer cylindrical surface 157 in the same manner as the flat portions 101 are formed in the outer cylindrical tube 82 in FIG. 7. Each of the first flat portions 156 has a first orifice 158, which extends through the outer cylindrical tube 155 to the ink cavity 83, providing communication from the ink cavity 83 to the exterior of the outer cylindrical tube 155. Each of the first flat portions 156 has a second orifice 159, which extends through the outer cylindrical tube 155 to the ink cavity 83, to provide communication from the ink cavity 83 to the exterior of the outer cylindrical tube 155. Thus, the first orifices 158 form a first array of nozzles and the second orifices 159 form a second array of nozzles with the two arrays of nozzles being offset from each other.

The outer cylindrical tube 155 has a plurality of second flat portions 160, which are longitudinally spaced, formed therein and diametrically disposed to the first flat portions 156. Each of the second flat portions 160 has a first orifice 161, which extends through the outer cylindrical tube 155 to provide communication from the ink cavity 83 to the exterior of the outer cylindrical tube 155, and a second orifice 162, which extends through the outer cylindrical tube 155 to provide communication from the ink cavity 83 to the exterior of the outer cylindrical tube 155. Thus, the row of the first orifices 161 forms a first array of nozzles and the row of the second orifices 162 forms a second array of nozzles with the two arrays being offset from each other.

Furthermore, the two arrays of nozzles in the first flat portions 156 are used with a first recording medium and the two arrays of nozzles in the second flat portions 160 are used with a second recording medium. Thus, each of the recording mediums has two offset rows of the droplets 39 directed thereto when the inner cylindrical tube 81 is vibrated radially.

It should be understood that the outer cylindrical tube 141 of FIGS. 12 and 13 could have a plurality of longitudinally spaced flat portions rather than the single continuous flat portion 143 in the same manner as the flat portions 156 are longitudinally spaced in the outer cylindrical tube 155 and be utilized without the nozzle plate 142. It also should be understood that the outer cylindrical tube 150 of FIG. 14 could be formed with a continuous flat portion on each side so as to have a nozzle plate mounted on each flat portion in the same manner as shown in FIG. 13. Likewise, each of the longitudinally spaced flat portions 156 and 160 in the outer cylindrical tube 155 of FIG. 15 could be continuous so as to have a nozzle plate mounted thereon in the same manner as shown in FIG. 13.

Figure 16:
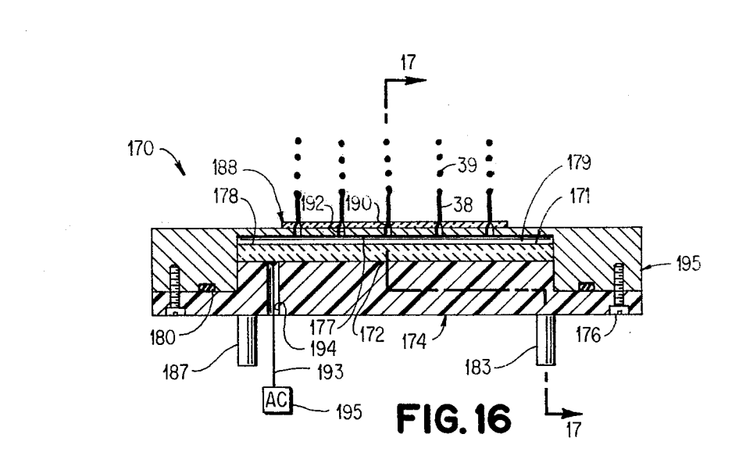
FIG. 16 is a longitudinal sectional view of a further modification of the ink jet head of the present invention in which an inner semi-cylindrical element of piezoelectric material forms the inner wall of the ink cavity with the ink cavity having no ink therein for clarity purposes and taken along line 16—16 of FIG. 17.
Figure 17:
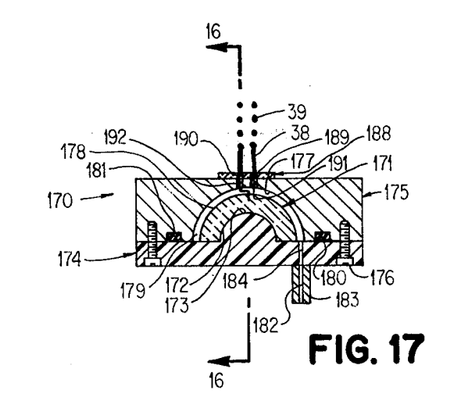
FIG. 17 is a sectional view of the ink jet head of FIG. 16 with the ink cavity having no ink therein for clarity purposes and taken along line 17—17 of FIG. 16.

Referring to FIGS. 16 and 17, there is shown an ink jet head 170, which includes a semi-cylindrical element 171 of a piezoelectric material. The element 171 has its inner semi-cylindrical surface 172 resting on a semi-cylindrical portion 173 of a support 174, which is formed of a suitable electrically insulating material such as plastic, for example.

A body 175, which is formed of metal or plastic, for example, is supported on the support 174 and secured thereto by mounting screws 176. The body 175 has a semi-cylindrical recess 177 to receive the semi-cylindrical element 171 and the semi-cylindrical portion 173 of the support 174 therein with the element 171 having its outer surface 178 spaced from the wall of the recess 177 when the body 175 is secured to the support 174 by the mounting screws 176. Accordingly, the spacing of the outer surface 178 of the semi-cylindrical element 171 the same distance from the wall of the recess 177 provides an ink cavity 179 therebetween with the ink cavity 179 having the same thickness at any position.

The body 175 has an O-ring 180 mounted in a groove 181 therein. The groove 181 surrounds the recess 177 of the body 175 and forms a seal with the support 174 to seal the ink cavity 179.

The ink cavity 179 has pressurized, conductive ink supplied thereto through a passage 182 in a plug 183 and a passage 184 in the support 174 from a pressurized source in the manner previously described relative to the ink jet head 10 of FIG. 1. When flushing is desired, the ink flows from the ink cavity 179 through a passage (not shown) in the support 174 and a passage (not shown) in a connecting plug 187 in the manner described relative to the ink jet head 10. The ink is grounded in any suitable manner.

The body 175 has a nozzle plate 188, which is preferably formed of silicon, bonded thereto. The nozzle plate 188 has a first row of longitudinally spaced nozzles 189 therein to form a first array of nozzles and a second row of longitudinally spaced nozzles 190 therein to form a second array of nozzles offset from the first array of nozzles.

Each of the nozzles 189 communicates with the ink cavity 179 through an orifice 191, which extends through the body 175 to the ink cavity 179, in the body 175. Each of the nozzles 190 communicates with the ink cavity 179 through an orifice 192, which extends through the body 175 to the ink cavity 179. The axis of each of the orifices 191 and 192 is disposed substantially perpendicular to the longitudinal axis of the semi-cylindrical element 171.

As previously mentioned, the semi-cylindrical element 171 is formed of a piezoelectric material. It is polarized so that it vibrates in a radial direction when a voltage is applied thereto. The operating frequency at which the semi-cylindrical element 171 is electrically excited is preferably below its resonant frequency but it could be at its resonant frequency.

The semi-cylindrical element 171 has the inner semi-cylindrical surface 172 metallized so that the semi-cylindrical element 171 can be connected through a lead 193, which extends through a passage 194 in the support 174, to an AC source 195 of power. Accordingly, when the AC source 195 of power is energized at a frequency, which is preferably equal to or below the resonant frequency of the semi-cylindrical element 171, the semi-cylindrical element 171 vibrates radially. This causes each of the streams 38 passing through one of the nozzles 189 and 190 to be broken up into the droplets 39.

Figure 18:
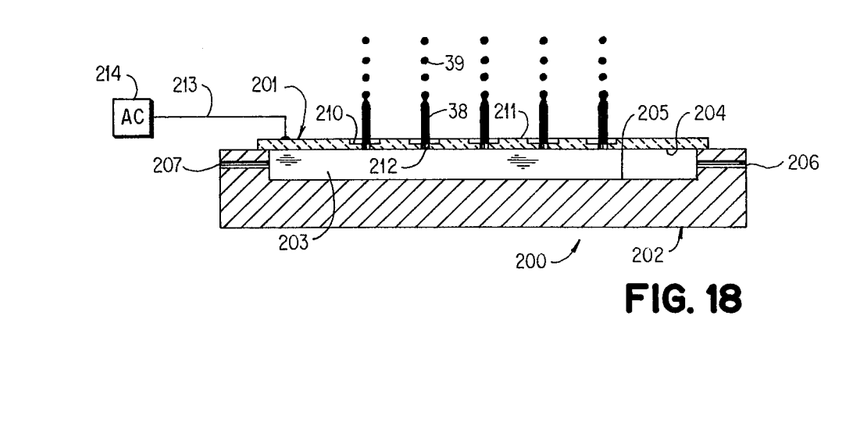
FIG. 18 is a longitudinal sectional view of still another form of the ink jet head of the present invention in which the ink cavity has an outer planar wall formed of a piezoelectric material with the ink cavity having no ink therein for clarity purposes.

Referring to FIG. 18, there is shown an ink jet head 200. The ink jet head 200 includes an outer planar element 201, which is formed of a piezoelectric material, and an inner block 202, which can be formed of metal, for example. The outer element 201 is secured to the inner block 202 by any suitable means such as bonding, for example.

An ink cavity 203 is formed between the outer element 201 and the inner block 202 within the inner block 202. The distance between an inner surface 204 of the outer element 201 and an inner surface 205 of the inner block 202 is substantially constant throughout the length of the ink cavity 203.

The ink cavity 203 has pressurized, conductive ink supplied thereto through a passage 206 in the inner block 202 from a suitable pressurized source in the same manner as discussed with respect to the ink jet head 10. Whenever it is desired to flush the ink cavity 203, the ink flows from the ink cavity 203 through a passage 207 in the inner block 202 to an ink reservoir or the like as discussed with respect to the ink jet head 10. The ink is grounded in any suitable manner.

The outer element 201 has a plurality of longitudinally spaced flat portions 210 in its outer surface 211. Each of the flat portions 210 has an orifice 212, which functions as a nozzle, formed therein and extending through the outer element 201 to provide communication from the ink cavity 203 to the exterior of the outer element 201. The axis of each of the orifices 212 is substantially perpendicular to the longitudinal axis of the outer element 201.

As previously mentioned, the outer element 201 is formed of a piezoelectric material. It is polarized so that it vibrates in a direction substantially parallel to the axis of each of the orifices 212 when a voltage is applied thereto. The operating frequency at which the outer element 201 is electrically excited is preferably below its resonant frequency but it could be at its resonant frequency.

The outer element 201 has its outer surface 211 metallized so that the outer element 201 can be connected through a lead 213 to an AC source 214 of power. Accordingly, when the Ac source 214 of power is energized at a frequency, which is preferably equal to or below the resonant frequency of the outer element 201, the outer element 201 vibrates in and out relative to its thickness and substantially parallel to the axes of the orifices 212. This causes each of the ink streams 38 passing through the orifices 212 to break up into the droplets 39 in the manner previously described relative to the ink jet head 10.

While the present invention has shown and described the surfaces of each of the ink cavities of FIGS. 1-17 as being cylindrical and each of the tubes, which form the cavity, as being cylindrical, it should be understood that such is not necessary for satisfactory operation. It is only necessary that the outer surface of the inner element and the cooperating inner surface of the outer means have substantially the same shape with the piezoelectric members, when electrically excited, vibrating in a direction substantially perpendicular to the longitudinal axes of the surfaces of the ink cavity.

An advantage of this invention is that ink droplets can be supplied to more than one recording medium from a single ink jet head. Another advantage of this invention is that an efficient ink jet head is produced. A further advantage of this invention is that droplets are uniformly generated from each of a plurality of arrays of ink jet nozzles at the same time.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An ink jet head for supplying a plurality of streams of ink droplets including:
   outer means having an inner cylindrical surface;
   an inner cylindrical tube disposed within the inner cylindrical surface of said outer means and having its outer cylindrical surface spaced from the inner cylindrical surface of said outer means, said inner cylindrical tube having its longitudinal axis substantially parallel to the longitudinal axis of the inner cylindrical surface of said outer means or coaxial therewith;
   an ink cavity formed between the outer cylindrical surface of said inner cylindrical tube and the inner cylindrical surface of said outer means and having pressurized ink therein;
   a plurality of arrays of ink jet nozzles communicating through said outer means with said ink cavity and from which the streams of ink droplets are supplied, said plurality of arrays of ink jet nozzles being spaced from each other about the periphery of said outer means;
   each of said ink jet nozzles having its axis substantially perpendicular to the longitudinal axis of said inner cylindrical tube;
   and only said outer means being formed of a piezoelectric material and vibrating radially when electrically excited to produce vibrations within the ink in said ink cavity so that a stream of substantially uniformly spaced ink droplets is supplied from each of said ink jet nozzles with substantially the same break-off point.

2. The head according to claim 1 in which said outer means is a cylindrical tube.

3. An ink jet head for supplying at least one stream of ink droplets including:
   outer means having an inner cylindrical surface;
   an inner cylindrical tube disposed within the inner cylindrical surface of said outer means and having its cylindrical surface spaced from the inner cylindrical surface of said outer means, said inner cylindrical tube having its longitudinal axis substantially parallel to the longitudinal axis of the inner cylindrical surface of said outer means or coaxial therewith;
   an ink cavity formed between the outer cylindrical surface of said inner cylindrical tube and the inner cylindrical surface of said outer means and having pressurized ink therein;
   at least one ink jet nozzle communicating through said outer means with said ink cavity and from which the stream of ink droplets is supplied;
   each of said ink jet nozzles having its axis substantially perpendicular to the longitudinal axis of said inner cylindrical tube;
   and only said outer means being formed of a piezoelectrical material and vibrating radially when electrically excited to produce vibrations within the ink in the ink cavity so that a stream of substantially uniformly spaced ink droplets is supplied from any of said ink jet nozzles.

4. The head according to claim 1 including a plurality of arrays of ink jet nozzles communicating through said outer means with said ink cavity, a stream of substantially uniformly spaced ink droplets being supplied from each of said ink jet nozzles with substantially the same break-off point, and said plurality of arrays of ink jet nozzles being spaced from each other about the periphery of said outer means.

5. An ink jet head for supplying at least one stream of ink droplets including:
   inner means and outer means having adjacent walls spaced from each other at a substantially constant distance;
   an ink cavity formed between the adjacent walls of said inner means and said outer means, said ink cavity having pressurized ink therein;
   at least one ink jet nozzle communicating through said outer means with said ink cavity and from which the stream of droplets is supplied;
   and only said outer means being formed of a piezoelectric material and vibrating when electrically excited to produce vibrations within the ink in said ink cavity in the direction of the axis of any of said ink jet nozzles so that a stream of substantially uniformly spaced ink droplets is supplied from any of said ink jet nozzles.

6. The head according to claim 5 in which each of said inner means and said outer means is a cylindrical tube.

7. The head according to claim 5 in which the adjacent walls of said inner means and said outer means are cylindrical surfaces.

8. The head according to claim 3 including at least one array of ink jet nozzles communicating through said outer means with said ink cavity with a stream of substantially uniformly spaced ink droplets supplied from each of said ink jet nozzles with substantially the same break-off point.

9. The head according to claim 8 in which the adjacent walls of said inner means and said outer means are cylindrical surfaces.

10. The head according to claim 5 including at least one array of ink jet nozzles communicating through said outer means with said ink cavity, said ink jet nozzles of any of said arrays having their axes substantially parallel to each other, and a stream of substantially uniformly spaced ink droplets being supplied from each of said ink jet nozzles with substantially the same break-off point.

11. The head according to claim 10 in which:

said inner means and said outer means are spaced from each other;

and each of said inner means and said outer means is a cylindrical tube.

12. The head according to claim 10 in which:

said inner means and said outer means are spaced from each other;

and the adjacent walls of said inner means and said outer means are cylindrical surfaces.

13. An ink jet head for supplying a plurality of streams of ink droplets including:

outer means having an inner surface defining a longitudinal passage therethrough;

an inner element disposed within said longitudinal passage in said outer means, said inner element having its outer surface of substantially the same shape as the inner surface of said outer means, said inner element having its outer surface spaced from the inner surface of said outer means, said inner element having the longitudinal axis of its outer surface substantially parallel to the longitudinal axis of the inner surface of said outer means or coaxial therewith;

an ink cavity formed between the outer surface of said inner element and the inner surface of said outer means and having pressurized ink therein;

a plurality of arrays of ink jet nozzles communicating through said outer means with said ink cavity and from which the streams of ink droplets are supplied, said plurality of arrays being spaced from each other about the periphery of said outer means;

each of said ink jet nozzles having its axis substantially perpendicular to the longitudinal axis of the outer surface of said outer inner element;

and only said outer means being formed of a piezoelectric material and vibrating radially when electrically excited to produce vibrations in the ink within said ink cavity so that a stream of substantially uniform spaced ink droplets is supplied from each of said ink jet nozzles with substantially the same break-off point.

14. A method of forming an ink jet head for supplying a plurality of streams of ink droplets including:

disposing an inner cylindrical tube within a longitudinal passage in an outer means having an inner cylindrical surface defining the longitudinal passage and with the longitudinal axes of the inner cylindrical tube and the inner cylindrical surface of the outer means being substantially parallel or coaxial;

forming an ink cavity between the outer surface of the inner cylindrical tube and the inner cylindrical surface of the outer means with pressurized ink therein;

disposing a plurality of arrays of ink jet nozzles about the periphery of the outer means in communication with the ink cavity through the outer means with each of the ink jet nozzles having its axis substantially perpendicular to the longitudinal axis of the inner cylindrical tube and from which the streams of ink droplets are supplied;

and forming only the outer means of a piezoelectric material to cause it to vibrate radially when electrically excited to produce vibrations in the ink within the ink cavity so that a stream of substantially uniformly spaced ink droplets is supplied from each of the ink jet nozzles with substantially the same break-off point.

15. The method according to claim 14 including forming the outer means as a cylindrical tube.

16. A method of forming an ink jet head for supplying at least one stream of ink droplets including:

disposing an inner cylindrical tube within an inner cylindrical surface in an outer means and with the longitudinal axes of the inner cylindrical tube and the inner cylindrical surface of the outer means being substantially parallel or coaxial;

forming an ink cavity between the outer cylindrical surface of the inner cylindrical tube and the inner cylindrical surface of the outer means with pressurized ink therein;

disposing at least one ink jet nozzle in communication with the ink cavity through the outer means with any of the ink jet nozzles having its axis substantially perpendicular to the longitudinal axis of the inner cylindrical tube and from which the stream of the ink droplets is supplied;

and forming only the outer means of a piezoelectric material so that the outer means vibrates radially when electrically excited to produce vibrations in the ink within the ink cavity so that a stream substantially uniformly spaced ink droplets is supplied from any of the ink jet nozzles.

17. The method according to claim 16 including disposing at least one array of ink jet nozzles in communication with the ink cavity through the outer means and with each of the ink jet nozzles having a stream of the substantially uniformly spaced ink droplets supplied therefrom with substantially the same break-off point.

18. A method of forming an ink jet head for supplying a plurality of streams of ink droplets including:

disposing an inner element within a longitudinal passage in an outer means having an inner surface defining a longitudinal passage and of substantially the same shape as the outer surface of the inner element with the longitudinal axes of the outer surface of the inner element and the inner surface of the outer means being substantially parallel or coaxial;

forming an ink cavity between the outer surface of the inner element and the inner surface of the outer means pressurized into therein;

disposing a plurality of arrays of ink jet nozzles about the periphery of the outer means in communication with the ink cavity through the outer means with each of the ink jet nozzles having its axis substantially perpendicular to the longitudinal axis of the outer surface of the inner element and from which the streams of ink droplets are supplied;

and forming only the outer means of a piezoelectric material to vibrate radially when electrically excited to produce vibrations in the ink within the ink cavity so that a stream of substantially uniformly spaced ink droplets is supplied from each of the ink jet nozzles with substantially the same break-off point.

* * * * *